US006851903B1

(12) United States Patent
Foggy

(10) Patent No.: US 6,851,903 B1
(45) Date of Patent: Feb. 8, 2005

(54) CARGO NET/MESH TARP SECURING AND SLING DEVICE

(76) Inventor: Bruce Edward Foggy, 2612 Stingray Ct., Sacramento, CA (US) 95826

( * ) Notice: Subject to any disclaimer, the term of this patent is extended or adjusted under 35 U.S.C. 154(b) by 0 days.

(21) Appl. No.: 10/434,750

(22) Filed: May 9, 2003

(51) Int. Cl.[7] .................................................. B60P 7/08
(52) U.S. Cl. ........................................ 410/118; 410/97
(58) Field of Search ............................ 410/96–97, 117, 410/118; 296/100.16; 87/2

(56) References Cited

U.S. PATENT DOCUMENTS

| | | | | |
|---|---|---|---|---|
| 2,696,360 A | * | 12/1954 | Toffolon | |
| 3,173,539 A | * | 3/1965 | Looker | |
| 5,040,934 A | * | 8/1991 | Ross | 410/97 |
| 5,193,955 A | * | 3/1993 | Chou | 410/100 |
| 5,328,310 A | * | 7/1994 | Lockney | 410/97 |
| 5,452,973 A | * | 9/1995 | Arvin | 410/118 |
| 5,458,447 A | * | 10/1995 | Clason | 410/100 |
| 5,876,167 A | * | 3/1999 | Selby | 410/97 |
| 6,017,174 A | * | 1/2000 | Ross et al. | 410/100 |
| 6,152,664 A | * | 11/2000 | Dew et al. | 410/100 |
| 6,419,433 B1 | * | 7/2002 | Chou | 410/97 |
| 6,439,815 B1 | * | 8/2002 | Liu | 410/106 |

* cited by examiner

*Primary Examiner*—Stephen Gordon
(74) *Attorney, Agent, or Firm*—James M. Ritchey

(57) ABSTRACT

Disclosed is a non-elastic cargo-securing and sling device having a central tarp with a perimeter edge band, a first set of grommets secured in the perimeter edge band, and an outer webbing net that surrounds the central tarp that is permanently secured to the perimeter edge band by stitching and the first set of grommets. The outer webbing net is fabricated from a set of longitudinal straps, a set of latitudinal straps, and a second set of grommets, with each of the second set of grommets permanently securing one longitudinal strap to one latitudinal strap, thereby producing the outer webbing net.

10 Claims, 1 Drawing Sheet

CARGO NET/MESH TARP SECURING AND SLING DEVICE

TECHNICAL AREA

Figure 1:
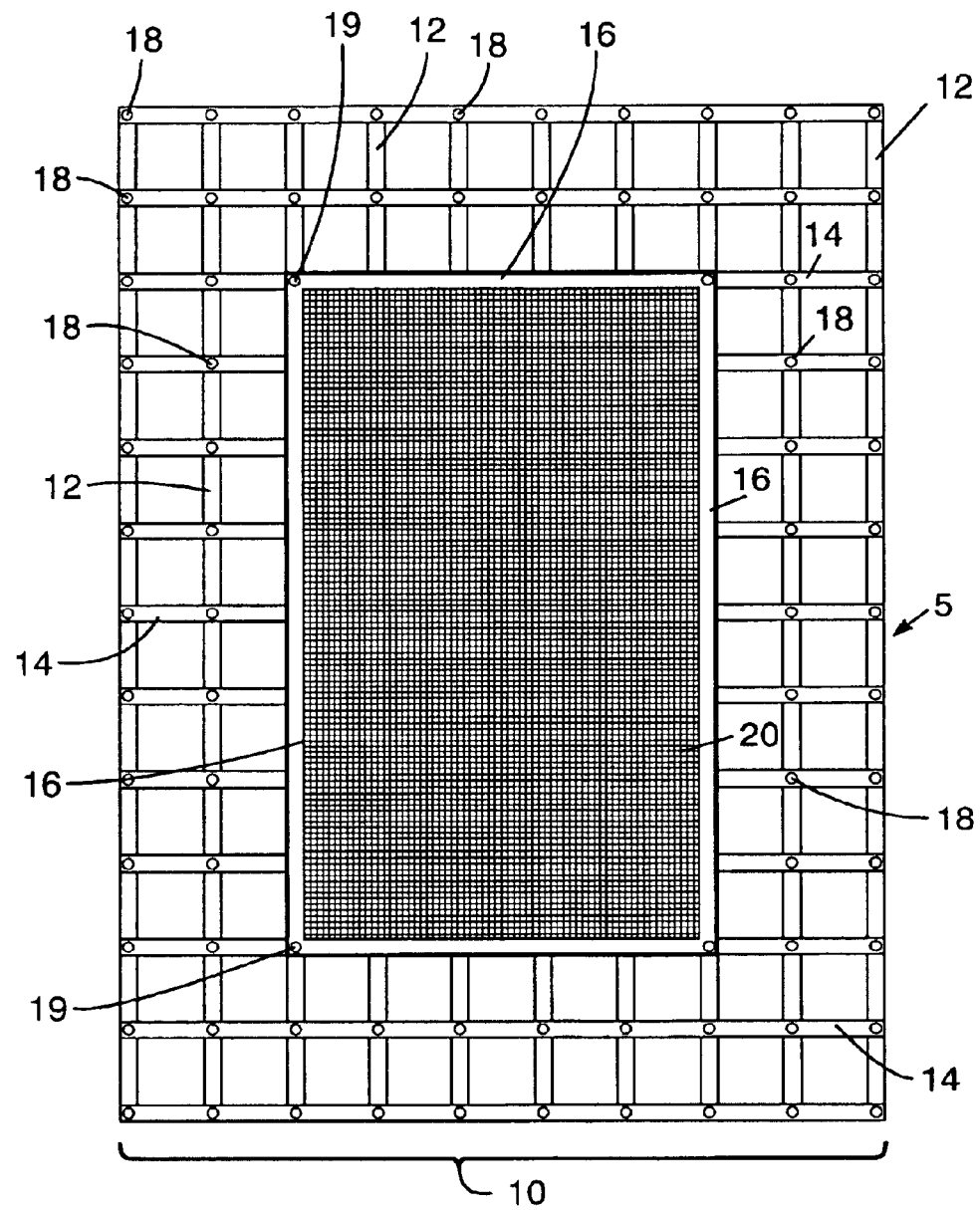

This invention relates to cargo restraining/securing and slinging devices, more particularly, to commercial cargo net securing and cargo net sling devices, as well as tarpaulin devices.

BACKGROUND OF THE INVENTION

There are more vehicles on the road than ever before and pickup trucks are the most popular and the number one selling vehicle in the United States. Many of these vehicles, such as pickup trucks, trailers, boats, sport utility vehicles, vans and small aircraft, all include designated areas where cargo of various types is generally stowed for transport from one location to another. Cargo in vehicles should always be secured and should be taught in all driver education classes. There are numerous deaths and injuries on our national highways that are the direct result of unsecured or improperly secured cargo-loads blowing and/or falling onto the roadway. In most cases nothing is used to secure cargo-loads and when something is used to secure cargo-loads, the tie-down method uses is a rope, a series of single straps, or various bungee cords with part of a trap, covering the load while the other part of the tarp is flapping in the wind. Bungee nets often do not tie-down cargo at all, they barely hold cargo in place, and bungee nets of all shapes take a considerable amount of time just to get untangled before they can be fitted over the cargo. Another time consuming method, involves a user going back and forth with rope in an attempt to get coverage for small items, with the fear of knots coming loose while in transit. Many existing nets are made of fish type netting and are limited in strength and versatility. The present invention is a solution to handle any obstacle presented in securing varied cargo and works where all other tie-downs have failed.

SUMMARY OF INVENTION

In accordance with this invention, disclosed is a combination cargo-net and mesh-tarp fabricated as a cargo securing and sling device for reversibly anchoring cargo to the body of any vehicle such as a pickup truck, trailer, boat, sport utility vehicle, van, and small aircraft. The exact use of the subject invention is up to the individual user's imagination, and includes many more uses than just a simple and traditional tie-down. The subject invention is unmatched in versatility and securing anchor points. Comprising the subject invention is a generally rectangle shape cargo-net perimeter securing and sling device with multiple anchoring points, one at each cross-strap intersection for strength and versatility. The subject center mesh-tarp cargo securing and sling device has more cargo surface-contact and cargo-hold than existing tie-down devices, from a refrigerator to yard clippings. The subject device may be utilized as a sling to carry camping gear at one time, and then as a stretcher for emergency rescue personnel at another time.

BREIF DESCIRPTION OF DRAWING

The present invention is further described with a accompany drawing, in which:

FIG. 1 is a plan view of the present invention.

DETAILED DESCRIPTION OF THE INVENTION

FIG. 1 shows the upper surface of the subject device 5. In FIG. 1 a lattice webbing member 10 is comprised of a plurality of longitudinal straps 12, and a plurality of latitudinal straps 14. Both the longitudinal straps 12 and the latitudinal straps 14 are permanently secured along the perimeter edge 16 of a central mesh-tarp member 20 by suitable means, including stitching, anchor point means such as grommets, and the like. The straps 12 and 14 are made of a highly resistant material that limits the destructive effects of outdoor elements such as sun, rain, heat, cold, dirt, and automotive exhaust fumes. In a preferred embodiment of the invention, the straps 12 and 14 are made of polypropylene, nylon, or polyester.

The plurality of the longitudinal straps 12 are positioned approximately parallel to each other, a set distance apart to ensure complete coverage of the cargo. The plurality of latitudinal straps 14 are approximately perpendicular to and traversing the longitudinal straps 12, thereby intersecting and forming the lattice webbing member 10. Where a latitudinal strap 14 crosses a longitudinal strap 12, away from the perimeter edge 16 of the central mesh-tarp member, the two straps 12 and 14 are affixed to one another, usually by grommets 18. Where either a longitudinal strap 12 or a latitudinal strap 14 aliens on the perimeter edge 16 of the central mesh-tarp member 20 it is secured to the center mesh-fabric perimeter edge 16 by suitable means such as stitching, grommets 19, and the like.

The center mesh-tarp fabric 20 is generally rectangular in shape and is affixed to the lattice webbing member 10 to form the subject cargo trap 5. As noted above, each of the appropriate longitudinal straps 12 and latitudinal straps 14 on the inside of the lattice webbing member 10 (the straps 12 and 14 that actually run into the central mesh-tarp's perimeter edge 16), where the straps 12 and 14 meet the mesh-tarp fabric 20, are joined along perimeter edge 16 is where the mesh-tarp fabric 20 is folded in a hem and stitched in place to the lattice webbing member 10 and often further secured by grommets 19.

The mesh-tarp fabric 20 is made of a highly resistant material that limits the destructive effects of outdoor elements such as sun, rain, heat, cold, dirt and automotive exhaust fumes. In a preferred embodiment of the subject invention, the mesh-tarp fabric 20 is made of polypropylene, nylon, or polyester vinyl coated fabric.

It is noted that the mesh-tarp fabric 20 has more cargo surface contact that any existing tie-down device, preventing small cargo from ejection onto the roadway and permitting the holding of large heavy cargo from shifting. Wind travels through the mesh openings, so that it can be easily applied and utilized in windy conditions.

In operation, cargo is loaded into a vehicles cargo area. The combination lattice webbed member 10 and the central mesh-tarp 20, comprising the subject invention 5, is positioned over the cargo and secured with any attaching spring snap hardware, rope, bungee cords, or cables with hooks which can be used in conjunction with the multiple grommets 18 and 19 to fasten the subject device 5 to any point on the vehicle such as tie-downs, rails, trunk lids, bumpers, roof racks, truck stake holes to prevent cargo from moving while in transit or during evasive maneuvers. The prevention of movement for small cargo-loads that are difficult to secure is achieved by, laying the subject device 5 flat in the vehicle's cargo area where it is firmly secured by one end to the vehicle, and then the cargo is loaded onto the subject invention 5 which is then folded like a blanket around the cargo and firmly secured to the same location on the vehicle. The movement of cargo can be achieved by laying the subject invention 5 flat on any surface, loading cargo onto the subject invention 5, with consideration of the cargo weight, gathering all excess lattice webbing 10, securing it with spring snap hardware, rope, cables with hooks, and the like, and lifting, usually by one or two individuals, depending on weight, and moving it to a desired destination.

What is claimed is:

1. A non-elastic cargo-securing and sling device, comprising:
   a) a central tarp member having a perimeter edge band;
   b) a plurality of first anchor point members formed in said perimeter edge band; and
   c) an outer net member surrounding said central tarp member and permanently secured to said perimeter edge band, wherein said outer net member comprises:
      i) a plurality of longitudinal straps;
      ii) a plurality of latitudinal straps; and
      iii) a plurality of second anchor point members, wherein each of said second anchor point members permanently secures one of said plurality of longitudinal straps to one of said plurality of latitudinal straps thereby producing said outer net member and said first anchor point members aid in securing said pluralities of longitudinal and latitudinal straps to said perimeter edge band.

2. A non-elastic cargo-securing and sling device according to claim 1, wherein said first anchor point members comprise grommets that provide a plurality of securing apertures through said perimeter edge band.

3. A non-elastic cargo-securing and sling device according to claim 1, wherein said second anchor point members comprise grommets that provide a plurality of securing apertures through said pluralities of longitudinal and latitudinal straps.

4. A non-elastic cargo-securing and sling device according to claim 1, wherein said pluralities of longitudinal and latitudinal straps are approximately perpendicular to one another and overlap one another.

5. A non-elastic cargo-securing and sling device, comprising:
   a) a central tarp member having a perimeter edge band;
   b) a plurality of first anchor point members formed in said perimeter edge band, wherein said first anchor point members comprise grommets that provide a plurality of securing apertures through said perimeter edge band; and
   c) an outer net member surrounding said central tarp member and permanently secured to said perimeter edge band, wherein said outer net member comprises:
      i) a plurality of longitudinal straps;
      ii) a plurality of latitudinal straps; and
      iii) a plurality of second anchor point members, wherein each of said second anchor point members permanently secures one of said plurality of longitudinal straps to one of said plurality of latitudinal straps thereby producing said outer net member and said first anchor point members aid in securing said pluralities of longitudinal and latitudinal straps to said perimeter edge band, wherein said second anchor point members comprise grommets that provide a plurality of securing apertures through said pluralities of longitudinal and latitudinal straps.

6. A non-elastic cargo-securing and sling device according to claim 5, wherein said pluralities of longitudinal and latitudinal straps are approximately perpendicular to one another and overlap one another.

7. A method of securing cargo to a vehicle, comprising the steps:
   a) deploying a non-elastic cargo-securing device over the cargo in the vehicle, wherein said non-elastic cargo-securing device comprises:
      i) a central tarp member having a perimeter edge band;
      ii) a plurality of first anchor point members formed in said perimeter edge band; and
      iii) an outer net member surrounding said central tarp member and permanently secured to said perimeter edge band, wherein said outer net member comprises:
         1) a plurality of longitudinal straps;
         2) a plurality of latitudinal straps; and
         3) a plurality of second anchor point members, wherein each of said second anchor point members permanently secures one of said plurality of longitudinal straps to one of said plurality of latitudinal straps thereby producing said outer net member and said first anchor point members aid in securing said pluralities of longitudinal and latitudinal straps to said perimeter edge band and
   b) anchoring said non-elastic cargo-securing device to the vehicle by tie-down means that reversibly mate with said first and said second anchor point members.

8. A method of securing cargo to a vehicle according to claim 7, wherein said first anchor point members comprise grommets that provide a plurality of securing apertures through said perimeter edge band.

9. A method of securing cargo to a vehicle according to claim 7, wherein said second anchor point members comprise grommets that provide a plurality of securing apertures through said pluralities of longitudinal and latitudinal straps.

10. A method of securing cargo to a vehicle according to claim 7, wherein said pluralities of longitudinal and latitudinal straps are approximately perpendicular to one another and overlap one another.

* * * * *